United States Patent
Sayeed

(10) Patent No.: US 6,317,456 B1
(45) Date of Patent: Nov. 13, 2001

(54) METHODS OF ESTIMATING SIGNAL-TO-NOISE RATIOS

(75) Inventor: Zulfiquar Sayeed, East Windsor, NJ (US)

(73) Assignee: The Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/479,976

(22) Filed: Jan. 10, 2000

(51) Int. Cl.$^7$ .............................. H04B 3/46; H04B 17/00; H04L 27/22

(52) U.S. Cl. ........................................... 375/227; 375/329

(58) Field of Search ................................. 375/224, 227, 375/316, 279, 280, 329; 329/304

(56) References Cited

U.S. PATENT DOCUMENTS

| | | | |
|---|---|---|---|
| 4,542,514 | * 9/1985 | Watanabe | 375/224 |
| 5,768,473 | * 6/1998 | Eatwell et al. | 704/226 |
| 5,809,065 | * 9/1998 | Dapper et al. | 375/216 |
| 6,108,610 | * 8/2000 | Winn | 702/77 |
| 6,122,015 | * 9/2000 | Al-Dhahir et al. | 348/614 |
| 6,122,610 | * 9/2000 | Isabelle | 704/226 |

\* cited by examiner

*Primary Examiner*—Tesfaldet Bocure

(57) ABSTRACT

Methods of estimating the signal-to-noise ratio (SNR) of a signal in an orthogonal frequency division multiplexed (OFDM) system include the steps of representing the signal as a complex symbol and rotating the complex symbol in a complex plane so that the signal component of the function lies substantially on the real axis of the complex plane and the noise function lies substantially on the imaginary axis of the complex plane. By obtaining the means squared value of the complex symbol and the variance of the complex symbol and dividing them, an estimate for the SNR of the signal is obtained.

8 Claims, 4 Drawing Sheets

METHODS OF ESTIMATING SIGNAL-TO-NOISE RATIOS

BACKGROUND OF THE INVENTION

1. Field of the Invention

This invention relates generally to methods for estimating a signal-to-noise ratio (SNR) of a signal. More specifically, the invention is directed to methods of estimating the SNR of a signal having a signal component and a noise component wherein the signal has been first modulated by a transmitter and then demodulated by a receiver so that the signal can be represented as a complex symbol having a real part and an imaginary part.

2. Description of the Related Art

Digital communications systems have emerged in the telecommunications field as important and efficient means for transmitting and receiving signals. These signals comprise noise components and signal components and must be filtered and transformed so that receivers in the system can adequately "hear" the signal components and output usable data to a user of the system. In digital communications systems, like orthogonal FDM (OFDM) systems, the noise components of the signals can overwhelm the desired components of the signal and so it has been desired to estimate or otherwise determine the SNR of the signal to thereby allow critical decisions like handoff and receiver shutdown to be made and to allow signal combining techniques to be undertaken.

OFDM systems, and many other communication systems, thus have an inherent need to estimate the SNR of the received signal. However, for conventional multiple and single carrier systems, methods have not been developed for estimating or calculating the SNR without a pilot signal being used. Most of these systems accordingly rely on determining the signal plus noise power as a figure of merit for the receivers in the systems. The SNR is typically used in diversity combining techniques, an optimal form of which is the "maximal ratio combining" (MRC) technique wherein different copies of the same information are combined after they are weighted by the ratio of the instantaneous signal voltage and the noise power of each copy.

SNR estimation techniques for calculating or otherwise estimating the SNR of a signal are describe in W. C. Jakes, Microwave Mobile Communications, IEEE Press, 1974, pp. 419–420. The Jakes reference teaches a technique wherein the SNR is calculated for a single carrier system by repeatedly turning the transmitter in the system on and off. During the off interval the receiver calculates the noise power and during the on interval calculates the signal plus noise power. These two power signals are then subtracted so that only the noise component remains. However, this technique takes valuable bandwidth away from the information transmission capability of the system. This technique and other personal communication system techniques are data aided techniques and are therefore complicated and computationally expensive. In cellular networks and PCS, MRC is oftentimes performed using a "Rake" receiver wherein the output of each of the "fingers" in the receiver is weighted by the output of the respective pilot fingers. Unfortunately, pilot aided coherent combining of the actual weights is not a function of the signal strength only, but of the signal strength plus the noise strength and, therefore, accurate SNR calculation or estimation cannot be accomplished with this technique. Thus these techniques, and others similar to it, do not adequately produce a calculation or estimation of the noise present in the signal.

There exists a long-felt need in the art, recognized by the inventor hereof, for methods of accurately estimating the SNR in a communication system. These methods should be simple to implement and effective across a wide range of communication systems such as asymmetric digital subscriber line (ADSL) systems, OFDM wireless and wireline systems, digital multitone (DMT) systems, digital radios, digital audio broadcasting systems, and other systems. It would further be desirable if such methods estimated the SNR of a system without taking up bandwidth in the system and provided accurate SNR results. Such needs have not heretofore been satisfied or achieved in the art.

SUMMARY OF THE INVENTION

The aforementioned long-felt needs are met, and problems solved, by methods provided in accordance with the present invention for estimating a SNR of a signal having a signal component and a noise component, wherein the signal has first been modulated and then demodulated by a receiver so that the signal can be represented as complex symbol having a real part and an imaginary part. The complex symbol is then preferably stored in a digital memory that is then accessed so that the complex symbol can be operated on such that the real and imaginary components of the complex symbol are rotated in a plane having a real and imaginary axis so to place the signal component substantially on the real axis and the noise component will lie substantially on the imaginary axis.

It is then desired to calculate a mean-squared value of the real part of the complex symbol and a variance value of the imaginary part of the complex symbol. By dividing these two values it is possible in accordance with the invention to obtain an estimation of the SNR which is a critical value for the system. The methods of the present invention efficiently and accurately estimate the SNR of a signal in a communication system. By rotating the complex symbol representation of the signal in a complex plane, it is possible to readily calculate the mean-squared value of the real part of the complex symbol and to calculate the variance from the imaginary part of the complex symbol which provides a simple and straightforward technique for estimating the SNR for many different types of modulated and demodulated signals. These results have not heretofore been attainable in the telecommunication and signal processing arts. These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals identify similar elements throughout the several views.

DETAILED DESCRIPTION OF THE PRESENTLY PREFERRED EMBODIMENTS

Figure 1:
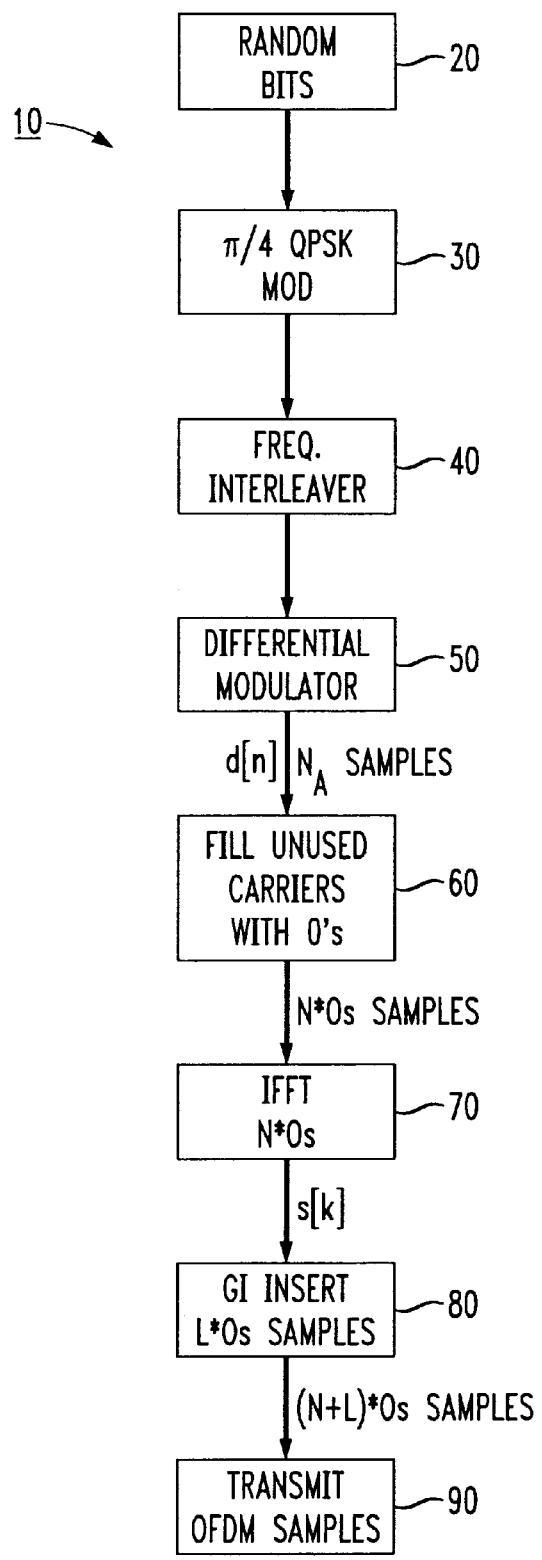
FIG. 1 is a block diagram of a transmitter in an OFDM system for modulating a signal having a noise component.

FIG. 1 depicts, by way of preferred and illustrative example, a transmitter 10 in an OFDM system. OFDM systems are designed to transmit a large number of substantially parallel sub-carriers. When the sub-carriers are transmitted, an OFDM symbol or "frame" is created that contains many modulated sub-carriers but, since the sub-carriers are transmitted substantially in parallel, inter-symbol-interference is minimized by making the signaling interval much larger than the channel delay spread. A well-known method for generating the OFDM frame is through use of an inverse fast Fourier transform (IFFT) which encodes the information, although it will be appreciated by those skilled in the art that other encoding schemes are readily usable in the methods of the present invention. Other digital encoding methods may also be employed in accordance with the inventive methods to perform SNR estimation or calculation. While OFDM systems are designed to have a large number of sub-carriers within each OFDM frame, the number of sub-carriers should be limited such that the maximum expected Doppler rate of the OFDM system is much smaller than the inter-carrier spacing.

A preferred form of the invention is described herein with respect to an OFDM system, although it will be further appreciated by those skilled in the art that the inventive methods are readily applicable to many other types of communication systems. Thus, the inventive methods for estimating the SNR of a signal may be applied in DMT systems, FDM systems, ADSL systems and others. All such systems, and equivalents thereof, are intended to be within the scope of the invention. In accordance with a most preferred form of the invention, and by way of illustrative example, the inventive methods will be described herewithin with respect to an OFDM wireless or wireline system.

An OFDM system is typically defined by the following parameters:

F Hz=total available bandwidth;

Na=the number of active carriers;

F/ Na=Inter-Carrier spacing;

Os >=2=over sampling rate;

Sample Duration=ts=(Na/F)/(N*Os);

FFT Size=N*Os>=2*Na;

OFDM Useful Symbol Duration=Tu=Na/F=N*ts (in seconds);

OFDM Guard Interval=L samples=L*ts seconds;

Total OFDM Symbol Duration=(N+L)* ts=Tu+Tg;

N=FFT length>Na

The Guard interval is a cyclic repetition of the output of the IFFT frame and is used to mitigate the effects of time-dispersiveness of the channel. The duration of the Guard Interval is preferably greater than the maximum expected delay spread of the channel.

With initial reference to the OFDM transmitter 10 depicted in FIG. 1, a signal source 20 generates a digital signal that is represented as a set of random bits that are mapped to a constellation in a modulator 30. In a preferred embodiment, the constellation is a quadrature phase shift keyed (QPSK) constellation, which is a particularly efficient modulation format for OFDM signals. As known by those skilled in the art, the constellation thus has four points on the complex plane on the unit circle at phases π/4, 3π/4, 5π/4 and 7π/4. However, other modulation schemes are also usable in the inventive methods, such as a phase shift keyed (PSK) format, TDMA, CDMA and other equivalent formats; all such formats are intended to be within the scope of the inventive methods. The invention will for ease of discussion be described throughout with respect to a QPSK format.

The output of QPSK modulator 30 is fed to an interleaver circuit 40 which frequency interleaves the output symbols over one OFDM frame, i.e. $N_A$ symbols. The output from frequency interleaver 40 is input to a differential modulator 50 which produces a differential quadrature phase shift keyed (DQPSK) constellation map that is packed into a buffer 60 of N* $O_s$ symbols wide and wherein unused carrier spaces in the buffer 60 are padded, i.e. filled, with 0's. This DQPSK constellation is input to an IFFT generator 70 that outputs a complex symbol of the form:

$$s[k] = \sum_{n=-N_A/2}^{N_A/2} d[n]\exp(j2\pi kn/(N^*O_s)),$$

where d[0] represents a null in the center of the spectrum and k is the is the index of samples and goes from 0 to N*Os −1. The rest of the N*$O_s$ terms in the summation are 0's. The insertion of 0's facilitates the use of a larger IFFT size than the number of carriers; this insures that the highest frequency sub-carriers will be at least two times oversampled, thus eliminating aliasing effects.

The Guard Interval is then inserted into the frame by interval insertion circuit 80 so that the first inserted L*$O_s$ samples are the last L*$O_s$ samples of the IFFT 70. The frame length output by the Guard Insertion circuit 80 is $O_s$ * (N+L). The samples are then transmitted at transmission block 90 to a remote receiver. Transmission block 90 first converts the OFDM signal to an analog signal with a suitable digital-to-analog (D/A) converter that imposes a sinx/x spectrum onto each of the sub-carriers in the frame. Preferably, the D/A converter operates at Fs=N*(F/Na)*$O_s$ Hz.

Figure 2:
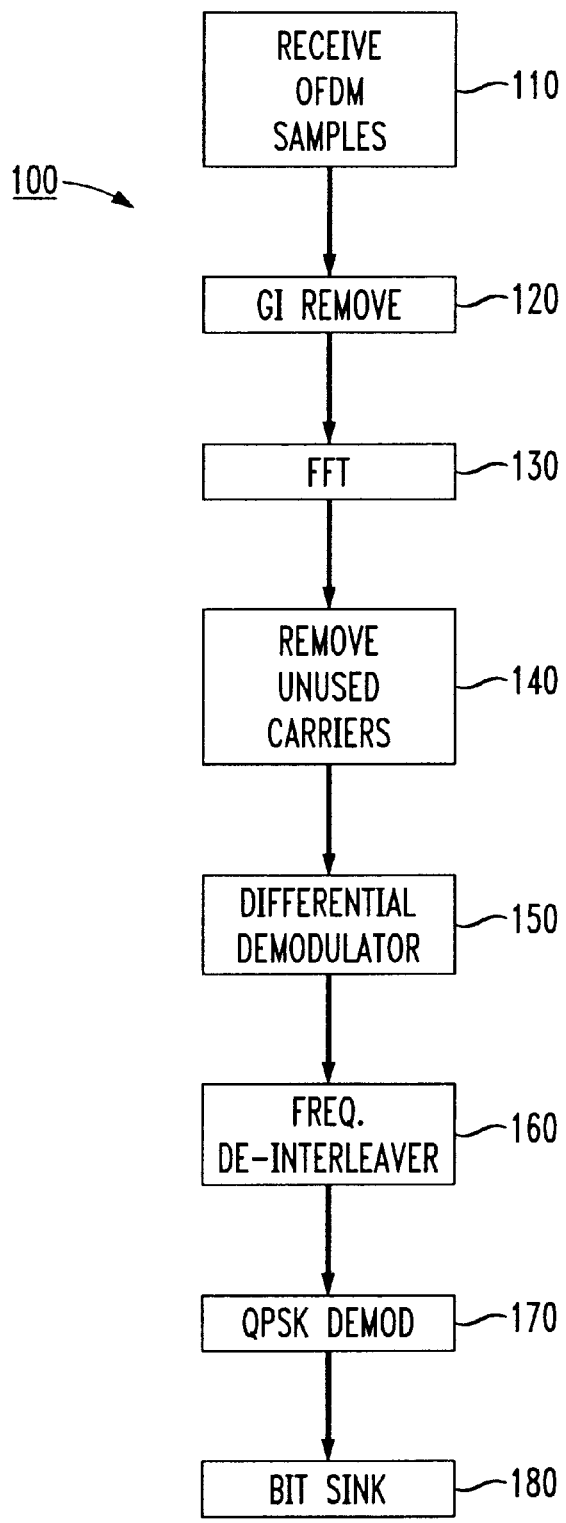
FIG. 2 is a block diagram of a receiver in an OFDM system for demodulating a signal having a noise component so that the SNR of the signal can be estimated in accordance with the present invention.

FIG. 2 depicts, by way of preferred and illustrative example, an OFDM receiver 100 for demodulating the OFDM signals received from transmitter 10. The analog signal transmitted by block 90 is received at a receiver block 110 that conventionally includes the appropriate antenna, circuit and software to process the analog signal and which also includes an analog-to-digital converter (A/D) to reconvert the analog signal back to a usable digital signal. The Guard Interval is removed by circuit 120 and a fast Fourier transform (FFT) is applied to the signal by circuit 130 where the signal is digitally stored in a buffer.

The unused carriers in the signal which were packed as 0's by block 60 are then removed by circuit 140 and the remaining signal is differentially demodulated by differential demodulator 150. A frequency de-interleaver circuit 160 rearranges the differentially demodulated signal by performing the opposite operation of the interleaver circuit and the resulting signal is then preferably QPSK demodulated by QPSK demodulator 170. Having QPSK demodulated the signal, the bits are now saved to a bit buffer and sent to a bit sink 180, which is simply a digital memory, for further processing. The signal stored in bit sink 180 comprises real numbers and the QPSK demodulation step therefore converts the complex numbers to real bits.

Figure 3:
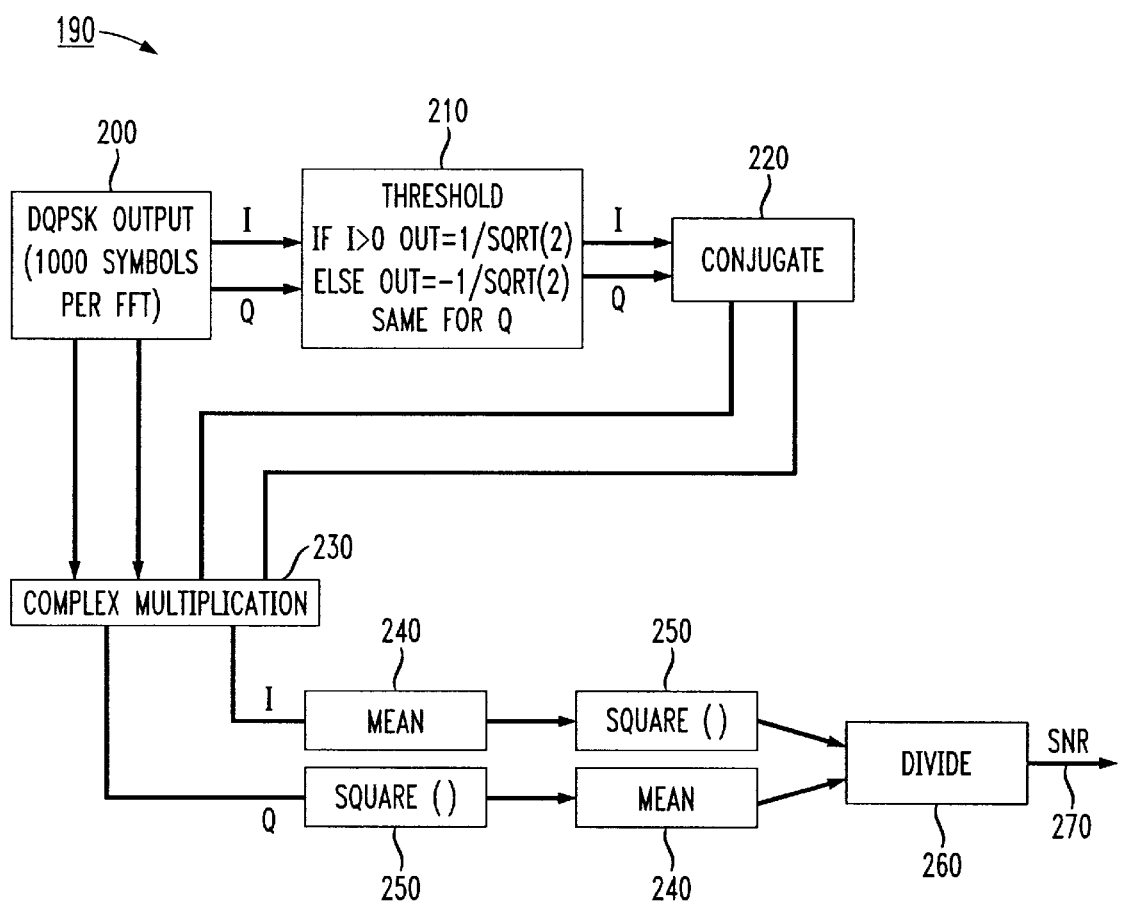
FIG. 3 is a block diagram of a circuit for estimating the SNR of a signal in accordance with the present invention.

The SNR of the signal is estimated after DQPSK demodulation and before QPSK demodulation. A preferred circuit for performing this estimation is depicted, by way of preferred but nonetheless illustrative example, at 190 in FIG. 3. The output of DQPSK demodulator 150 is fed to a storage device, such as RAM, DRAM, EPROM or other appropriate intermediate memory 200, at a rate of $N_A$ symbols per FFT.

In accordance with the invention, circuit 190 estimates the SNR of the signal by rotating the signal points in the complex plane after demodulation so that the signal lies on the right half of the plane. The signal's real component (I) and imaginary component (Q) are operated on to accomplish this transformation.

In order to so transform the signal, the output is preferably modeled as the following statistic:

$$out\_i=(beta\_i*d\_i+n\_i)*conj[beta\_(i-1)*d\_(i-1)+n(i-1)],$$

where beta_i is the complex channel imposed sub-carrier gain for sub-carrier i, d_i is the complex DQPSK data (signal component) carried by the $i^{th}$ sub-carrier; and n_i is the noise component on the in sub-carrier.

The estimated SNR can be obtained by dividing the mean of this statistic squared by the variance of this statistic. Assuming that beta_i and beta_(i−1) are the same, i. e. that there is frequency coherence, the mean is:

$$abs(sq(beta\_i),$$

and the variance is:

$$2*sigma\textasciicircum 2*abs(sq(beta\_i)),$$

where sigma^2 is the variance of the noise.
The SNR is then:

$$0.5*(abs(sq(beta\_i))/(sigma\textasciicircum 2).$$

From the immediately above equation, it can be seen that the SNR estimate from the OFDM system is scaled by 0.5 which produces a 3 dB loss due to differential encoding.

A threshold is set by circuit block 210 for the imaginary and real components of the signal such that if either of the components has a value greater than 0 the value is set to $1/\sqrt{2}$ and if either of the values are less than 0, they are set to $-1/\sqrt{2}$. This operation rotates all points such that the signal component would be substantially on the real axis and the noise on the imaginary axis. The conjugation at 220 and multiplication 230 of this figure is the function that achieves the rotation. It is then preferred to extract the mean at blocks 240 from the real axis the square of the complex sub-carrier gain at block 250. These values are then divided at block 260 to yield an estimate 270 of the SNR for the OFDM system.

It will be appreciated by those with ordinary skill in the art that the methods of the present invention may be readily implemented using a computer processor and associated software. Thus, the circuitry of FIGS. 1 through 3 may be integrated with a microprocessor associated with the respective transmitter and receiver shown therein and having software to perform the above-described calculations. An application specific integrated circuit (ASIC) or chip set may also be constructed to perform the inventive methods, or a digital signal processor (DSP) may be designed to perform these methods. All of these embodiments and equivalents thereof are intended to be within the scope of the invention.

Figure 4:
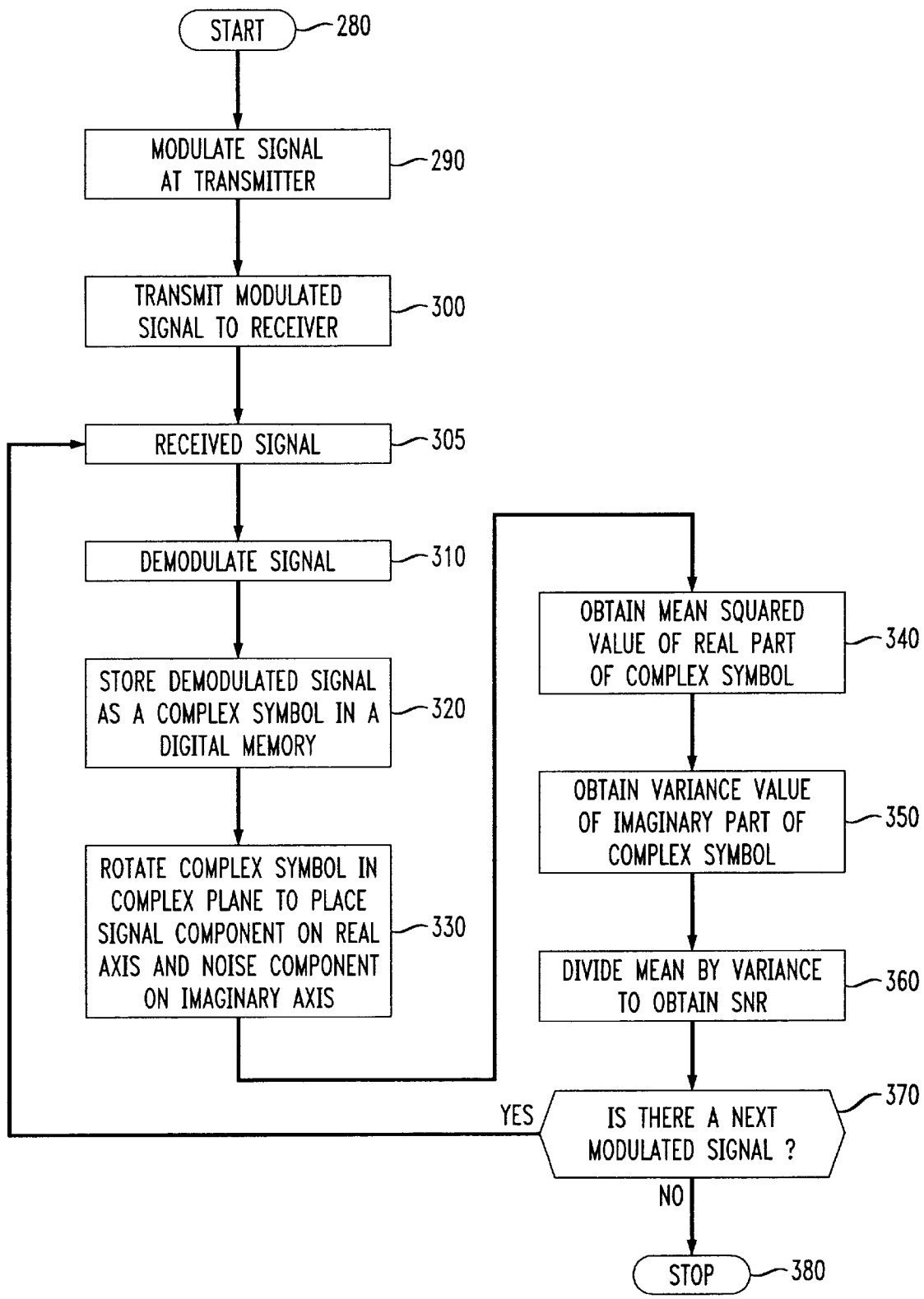
FIG. 4 is a flow chart depicting a preferred method for estimating the SNR of a signal in accordance with the present invention.

FIG. 4 is a flow chart of an exemplary method of the present invention that can be programmed in any software code and implemented on any of the equivalent hardware platforms described above. The method starts at step 280 and, at step 290, the signal is modulated by the transmitter. At step 300, the modulated signal is transmitted to the receiver and at step 305 the signal is received. The signal is demodulated at step 310 and the demodulated signal is stored as a complex symbol in a digital memory device at step 320. At step 330, the digital memory device is accessed and the complex signal is rotated in the complex plane to place the signal in the first quadrant of the plane. A π/4 shift is added to the real and imaginary parts of the complex symbol so that the signal component of the signal lies substantially on the real axis of the complex plane and the noise component of the signal lies substantially on the imaginary axis of the complex plane.

The mean-squared value of the real part of the complex symbol is obtained at step 340 and the variance value of the imaging part is obtained at step 350. At step 360, the mean-squared value is divided by the variance and an estimation of the SNR of the signal is thereby obtained. It is then determined at step 370 whether there is a next received signal for which the SNR is to be determined; if so, then the method returns to step 305 or if not, the method terminates at 380. It will be recognized by those skilled in the art that the method shown in the flow chart of FIG. 4 may be implemented as a continuous loop in which case steps 370 and 380 may be eliminated.

The methods of the present invention thus provide an efficient and economical way to estimate the SNR of a signal in an OFDM or related system. The inventive methods are simple to implement with known hardware and take advantage of the orthogonality of sub-carriers in a multi-carrier system to accurately determine the SNR, thereby allowing critical decisions like hand off and receiver shut-down to be effectively made. These advantageous results have not heretofore been achieved in the art. While there have been shown and described and pointed out certain fundamental novel features of the invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same result are within the scope of the invention. Substitutions of elements from one described embodiment to another are also fully intended and contemplated. It is the intention, therefore, to be limited only as indicated by the scope of the claims appended hereto.

I claim:

1. A method of estimating a signal-to-noise ratio (SNR) of a signal having a signal component and a noise component, wherein the signal has been first modulated according to a predetermined modulation scheme and then demodulated by a receiver so that the signal can be represented as a complex symbol having a real part and an imaginary part, comprising the steps of:

storing the complex symbol in a digital memory;

accessing the digital memory to rotate the real and imaginary components of the complex symbol in a plane having an imaginary axis and a real axis until the signal components lie substantially in an upper right hand quadrant of the plane;

obtaining a mean-squared value from the real part of the rotated complex symbol;

obtaining a variance value from the imaginary part of the rotated complex symbol; and dividing the calculated mean-squared value by the calculated variance value to thereby obtain an estimate of the SNR of the signal.

2. The method of claim 1, wherein the signal is modulated and demodulated according to a quadrature phase shift keyed (QPSK) format.

3. The method of claim 2, further comprising the step of differentially modulating the modulated QPSK and differentially demodulating the modulated QPSK signal before said step of storing the complex symbol in a digital memory.

4. The method recited in claim 3, wherein the complex symbol comprises the function:

$$s[k] = \sum_{n=-N_a/2}^{N_a/2} d[n]\exp(j2\pi kn/(N^*O_s)),$$

where k is an index of samples;
Na=a number of active carriers;
N=FFT length>Na; and
d[0] represents a spectrum center null.

5. The method recited in claim 4, wherein the complex symbol stored in the digital memory is modeled as:

out_i=(beta_i*d_i+n_i)*conj[beta_(i-1)*d_(i-1)+n(i-1)], where beta_i is a complex sub-carrier gain for sub-carrier i,
d_i is a complex DQPSK data (signal component) carried by the $i^{th}$ sub-carrier; and
n_i is a noise component on the $i^{th}$ sub-carrier.

6. The method recited in claim 5, wherein the mean squared value of the complex symbol comprises the function:

abs(sq(beta_i)).

7. The method recited in claim 6, wherein the variance value of the complex symbol comprises the function:

2*sigma^2*abs(sq(beta_i)), where sigma^2 is a variance of the noise component.

8. The method recited in claim 7, wherein said step of dividing comprises estimating the SNR using the function:

0.5*(abs(sq(beta_i))/(sigma^2).

* * * * *